June 2, 1970 J. BEREZNAK 3,515,820
FEATURE EQUIPMENT FOR USE IN ELECTRONIC SWITCHING TELEPHONE SYSTEMS
Filed June 6, 1966
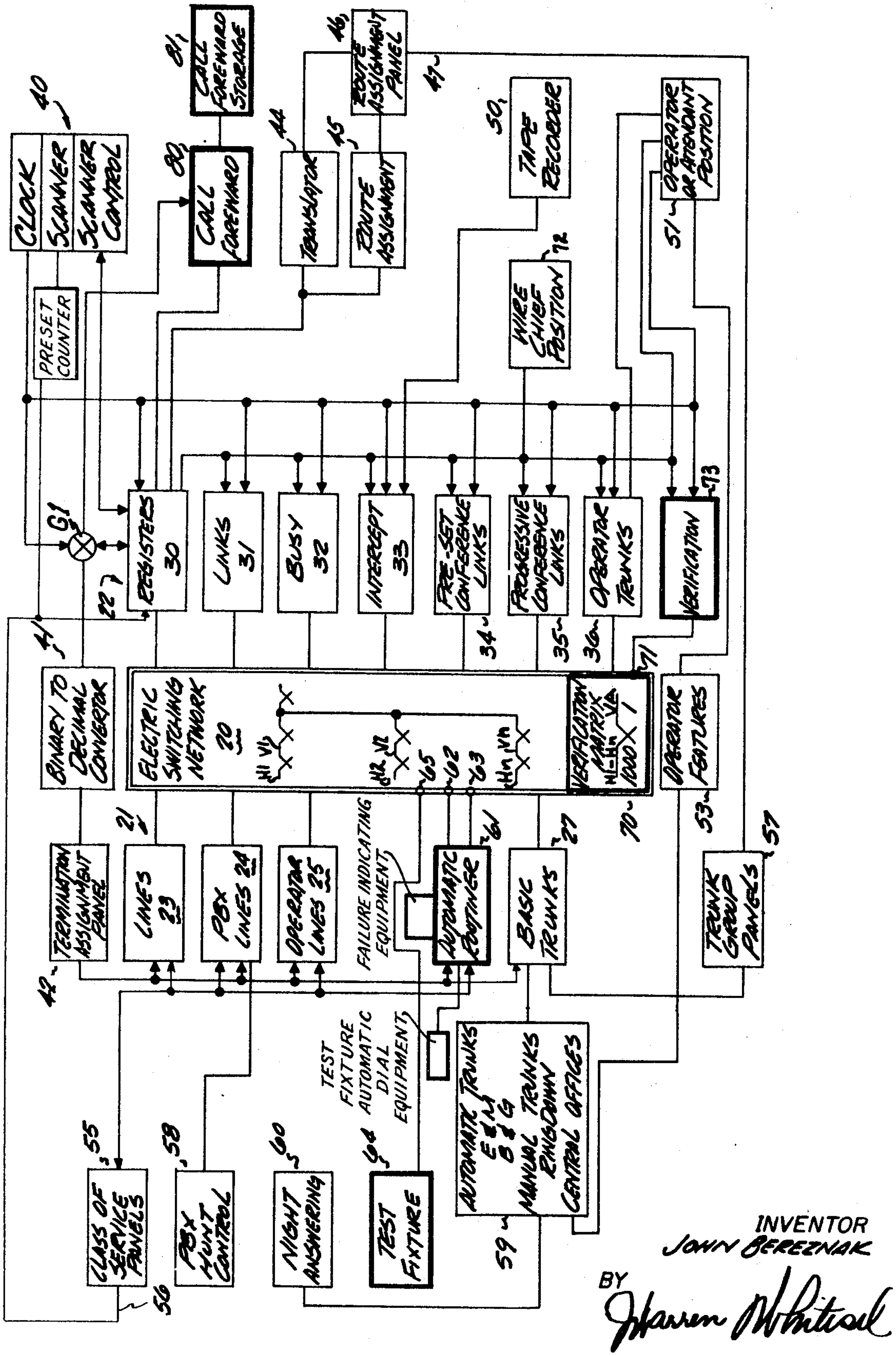
INVENTOR
JOHN BEREZNAK
BY [signature]
ATTORNEY United States Patent Office 3,515,820

Patented June 2, 1970

3,515,820

FEATURE EQUIPMENT FOR USE IN ELECTRONIC SWITCHING TELEPHONE SYSTEMS

John Bereznak, Oaklawn, Ill., assignor to International Telephone and Telegraph Corporation, New York, N.Y., a corporation of Maryland Filed June 6, 1966, Ser. No. 555,518
Int. Cl. H04m 3/22
U.S. Cl. 179—175.2 3 Claims

ABSTRACT OF THE DISCLOSURE

An automatically actuated circuit repeatedly places test calls to a designated directory number location. Thus, equipment is seized and exercised at random. If the call goes through, there are no further problems, and the connection is released. However, if troubles are encountered, a fault is indicated. Since many circuits in the system are mounted on printed circuit cards, the routiner may be made to function as a card tester by substituting new cards for the cards which are exercised during a test call. Still other features may be provided by this arrangement.

This invention relates to electronic switching telephone systems and more particularly to means for giving special feature service in such systems. The invention is especially—although not exclusively—well suited for use in connection with an electronic switching system described in U.S. Pat. 3,221,105, entitled, "Electronic Switching Telephone System," granted on Nov. 30, 1965, to Arseneau, Bereznak, and Osborn and assigned to the assignee of this application.

The features which a switching system may provide are many and varied. Generally speaking, the nature of these features is limited only by the inherent design of the system itself. The usual situation is that a certain feature can be added to a system only if the original design of the system is compatible with that feature. If not, it is unlikely that the feature may be added to that system at any reasonable cost.

Exemplary of the features being described are line verification, trouble finding, line routining, call forwarding, and the like. Line verification provides a method of cutting in on a busy line. This feature could be used by an operator to verify a directory number that was given her by a calling subscriber—as during a toll call, for example. Maintenance men could also use this feature to cut in on falsely busy lines to test and ascertain the condition thereof. Testing is not limited to such an arrangement, however, because automatic routining equipment may be used to locate trouble before there is a complaint; or, the routining equipment might be used to test equipment before it is put into use.

Accordingly, an object of this invention is to provide new and improved special features capabilities which may be added to virtually any switching system. More particularly, an object of the invention is to provide means for discovering and reporting any trouble conditions which may occur in the system. In this connection, an object is to conduct both automatic and non-automatic routine tests on equipment before and after it is put into operation.

Yet another object is to reduce the cost of giving these and other special features by making a maximum re-use of other equipment normally required in a switching system. Furthermore, an object is to provide circuitry which has generally applicability to many systems and is not limited in its use to a single specific system.

In accordance with one aspect of the invention, these and other objects are accomplished by means of auxiliary circuits which may be distributed among the other circuits normally built into a system. Thus, an automatic routiner may be among a plurality of line circuits normally connected into a switching system. The routiner is adapted to place calls in a manner such that it seizes switching equipment at random. The routiner observes the progress of the call and reports any troubles which are encountered while its call is being processed. In addition, the routiner may dial a special number and gain access to a particular set of terminals for test purposes. Thus, before equipment is put into service, it may be temporarily associated with these terminals and tested when they are seized by the routiner. Verification and call forwarding equipment may be coupled into the system among the control circuits normally used in the systems. Thus, these auxiliary circuits adapt the system to process calls in its conventional manner, but also to provide the special features not previously offered by the system.

The above mentioned and other features of this invention and the manner of obtaining them will become more apparent, and the invention itself will be best understood by reference to the following description of an embodiment of the invention taken in conjunction with the accompanying drawings, in which the single sheet of drawing shows the block diagram of a telephone system incorporating the principles of the invention.

The telephone switching system disclosed in the drawing has an electronic switching network 20 which may include solid state crosspoints arranged in a plurality of cascaded matrices. The network inlets are here pictured at the left and outlets at the right of this network 20.

A number of individual control circuits 22 are con- to the network inlets for demanding and receiving service. These line circuits may include any well known equipment such as: a plurality of subscriber lines 23, a PBX group 24, an operator position line 25, and a plurality of trunk lines 27. Connected in among these well known line circuits are an automatic routiner and a test fixture.

A number of individual control circuit 22 are connected to the network outlets to control the various types of calls which may be completed by the system. The control circuits 22 may also include a number of different well known types of circuits such as: one or more registers 30, a plurality of interconnecting links 31, busy links 32, intercept links 33, either preset or programmed conference links 34, 35 and trunks 36 to the operator positions. In general, these circuits have been described in many prior art patents.

Around the periphery of this system are ancillary equipment which is shared by the above described equipment during the processing of a call. Among the ancillary equipment are a time base generator 40 which generates time signals for identifying lines, links, and other circuits. These time signals are gated at G1, decoded at 41, and applied to identify the various lines according to a pattern of cross connections in a number assignment panel 42.

The registers 30 have access to a translator 44 which reads out signals identifying the physical location of the actual equipment required to complete a call identified by the dial information which the register receives from a calling line. These equipment location signals may be modified by a route assignment control circuit 45 arranged according to a pre-wired preference in an assignment panel 46. These preferences may in turn be modified via a circuit 47 according to the instantaneous busy, idle, or other conditions of availability for the various pieces of equipments which are used.

A tape recorder 50 is adapted to playback any prerecorded messages required to advise a subscriber as to the action which should be taken when a call is intercepted at 33.

An operator or attendant at position 51 has access to the network 20 for placing calls via the operator line circuits 25 and for receiving calls via operator trunk circuits 36. During the processing of calls, the operator may use any suitable equipment at 53 for performing necessary service.

A circuit 55 marks the various lines according to the class of service which they receive. Depending upon the nature of this class of service, signals may be sent over connections 56 to registers 30 for allowing or restricting service to a line with respect to its ability for making trunk or other specific kinds of calls.

A control circuit 58 controls PBX trunk hunting among the PBX group of line circuits 24, in any known manner.

Cross connections among the various trunk circuits 59 allow the incoming calls to be directed by night answer circuit 60 to any assigned one of the lines 23.

The circuits described thus far may take any suitable and known form. Distributed among these and other known circuits are a plurality of circuits which are connected to the inlets or outlets of a switching network. In general, these are the circuits shown in the drawing by means of boxes drawn with heavily inked lines.

To test the switching equipment, an automatic routiner circuit 61 is connected to network inlets at the access points 62, 63 where two subscriber lines might normally be expected to be connected. This routiner has the built-in capacity for repeatedly placing calls, and dialing out at one of these inlet points the directory number assigned to the other of these inlet points. Each time that he number is dialled, a switch path is extended from the calling point of access 62, through the network 20 to a control circuit 22, and then back to the called point of access 63.

During each step in the process required to complete this switch path, the routiner 61 monitors the events as they occurred in the switching equipment to determine whether the call has progressed in a satisfactory and normal manner. If it has so progressed, the switch path is immediately released and the directory number of the called point 63 is dialled again. If the switch path encounters nonstandard conditions, suitable trouble recording equipment stores a notation thereof. The trouble recorder may take any well known form, such as a printer, perforator, or lamp and lock circuit, for example.

It should be noted that the routiner seizes equipment on the basis of its idle and available conditions. Such conditions occur at random in the system and may be predicted on the basis of a traffic or probability study. Thus, the routiner operates responsive to a time base or other cyclic means on a schedule calculated to distribute the equipment routining calls over the maximum amount of equipment in the network 20 and among the control circuits 22. Since all equipment is seized on a random basis the entire system is tested on the basis of its probability of seizure.

If a fault is found—or if new equipment is about to be put into service—maintenance personnel may connect a substitute to the test fixture 64 and the predetermined network outlets 65. Then the directory number of the outlet is dialled from the automatic routiner 61. Thus, the routiner causes a switch path to be extended through the network 20 to seize and test the equipment in test fixture 64.

In greater detail, the invention contemplates a test fixture 64 which is connected to the network 20 at the point 65 in the same manner that a line circuit 21 is connected to the network. In fact, the invention contemplates a use of printed circuit cards having the components necessary for performing the noted functions. Conventionally, these printed circuit cards are slidably supported on suitable tracks in a library rack. Thus, the test fixture 64 may be merely an extra set of tracks and printed circuit card connectors in the same library rack which receives and supports the lines 21. Therefore, if a printed circuit card having a line circuit thereon is to be tested, it is plugged into the test fixture 64 located among the usual line circuit connections 64. The test fixture directory number is dialled at the routiner location 61. Responsive thereto the network 20 extends a path to access point 65 and connects the routiner 61 to the printed circuit card being tested.

Unless it is manually overridden, the system will control the routining on a basis of the availability of system equipment. That is, when three or more registers are busy, for example, a preset counter associated with the scanner equipment 40 sends an inhibiting signal so that the routiner circuit 61 cannot gain access to the network 20 unless it is humanly controlled to do so.

Means are provided for seizing a line when it is busy, such means being called "verification" equipment. In greater detail, sometimes there will be faults or other conditions which make a line busy when it should be tested or otherwise seized, as during long distance calls where the identity of a called party is challenged by the operator.

To provide for this busy line seizure feature, an auxiliary network 70 is interposed between a verification network outlet 71 and each inlet to the principal switching network 20. If the network 20 is in a conventional form, it includes at least a primary coordinate matrix.

The verification network 70 may, therefore, be conveniently arranged as an additional vertical running across each horizontal of the primary matrix. In greater detail, an exemplary verification network 70 is here designated as having 1000 inlets and one outlet. Each inlet has one crosspoint connection from a primary horizontal to the additional vertical which forms the single outlet. For example, first, second and last horizontals in the primary matrix are here designated H1, H2 . . . H*n*. The 1000 inlets of the verification matrix 70 are designated H1–H*n*. An exemplary primary vertical is designated V1. The additional vertical of the verification matrix 70 is designated VA. Busy conditions cannot prevent a seizure of an inlet H1–H*n* when a connection is completed via this auxiliary network 70. In order to make this busy line connection, a wire chief at position 72 or an operator at position 51 uses a verification circuit 73 to seize a line circuit through the single outlet VA in network 70, having the network inlets such as 62, 63, 65, etc., connected to its horizontals H1–H*n* the vertical outlet VA may have an opposite voltage signal applied thereto to enable seizure of a busy horizontal in any manner well known to those skilled in the art.

The call forwarding feature shown and described herein is claimed in a co-pending application wherein I am listed as joint inventor with R. R. Reed. That co-pending application entitled "Feature Equipment for Use in Electronic Switching Telephone Systems," has Ser. No. 555,571, was filed on June 6, 1966, now Pat. No. 3,348,274 and is assigned to the assignee of this invention.

While the principles of the invention have been described above in connection with specific apparatus and applications, it is to be understood that this description is made only by way of example and not as a limitation on the scope of the invention.

I claim:

1. An electronic switching system comprising network means having line circuits connected to the inlets and control circuits connected to the outlets of said network means, means for selectively extending voice paths through said network means, a plurality of system equipment means distributed among the circuits connected to both said inlets and outlets, automatic routine test means for continuously automatically extending test call paths through said network means using said equipment and control circuits at random, said automatic routine test means having dual access to said network means, said dual access providing calling and called points at the inlets of said network means, said control circuits including a plurality of registers, means responsive to a predetermined number of said plurality of registers being in the busy condition for inhibiting said automatic routine test means from extending the calls between said calling and called access points.

2. The system of claim 1 and a test fixture associated with said line circuits, said test fixture being positioned in among said line circuits and connected to said network as said lines are connected, means comprising said test fixture for receiving and becoming electrically associated with equipment used to provide said line circuit functions, means associated with said automatic routine test means for dialing the directory number of said test fixture from said other inlet whereby said test fixture is seized from said automatic routine test means, and whereby said automatic routine test means tests the equipment then associated with said test fixture.

3. The system of claim 2 wherein said network comprises at least one primary matrix, each of said line circuits being individually associated with a horizontal of said matrix whereby said horizontals form said inlets to said network, an additional vertical running across each horizontal of the primary matrix, crosspoint means for selectively connecting any one of said horizontals with said additional verticals, and means associated with said outlets for selectively operating said crosspoints regardless of whether the associated horizontal is or is not busy.

References Cited

UNITED STATES PATENTS

| | | | |
|---|---|---|---|
| 2,991,335 | 7/1961 | Marwing et al. | 179—175.23 |
| 3,047,680 | 7/1962 | Robb | 179—175.2 |

KATHLEEN H. CLAFFY, Primary Examiner

A. B. KIMBALL, Jr., Assistant Examiner